United States Patent [19]

Miller et al.

[11] 4,139,172
[45] Feb. 13, 1979

[54] STAGGERWING AIRCRAFT

[75] Inventors: Chester W. Miller, St. Louis County; Ray N. Herring, Overland, both of Mo.

[73] Assignee: McDonnell Douglas Corporation, St. Louis, Mo.

[21] Appl. No.: 773,967

[22] Filed: Mar. 3, 1977

[51] Int. Cl.² ........................... B64C 3/00; B64C 3/38
[52] U.S. Cl. ..................................... 244/45 R; 244/46
[58] Field of Search .................. 244/45 R, 45 A, 46, 244/13, 15, 49, 90 R, 130, 83 C; D12/71, 77

[56] References Cited

U.S. PATENT DOCUMENTS

| | | | |
|---|---|---|---|
| D. 127,159 | 5/1941 | Oliver | D12/77 |
| D. 195,383 | 6/1963 | Rellis | D12/77 |
| 1,819,948 | 8/1931 | Diago | 244/46 |
| 2,504,767 | 4/1950 | Wallis | 244/46 |
| 2,576,294 | 11/1951 | Geraci | 244/45 R |
| 2,874,922 | 2/1959 | Whitcomb | 244/130 |
| 3,539,133 | 11/1970 | Robertson | 244/83 C X |
| 3,870,253 | 3/1975 | Leidy | 244/46 |
| 3,971,535 | 7/1976 | Jones | 244/46 |
| 4,053,125 | 10/1977 | Ratony | 244/46 |

FOREIGN PATENT DOCUMENTS

| | | | |
|---|---|---|---|
| 150962 | 4/1953 | Australia | 244/46 |
| 1124991 | 10/1956 | France | 244/46 |

*Primary Examiner*—Galen L. Barefoot
*Attorney, Agent, or Firm*—Gravely, Lieder & Woodruff

[57] ABSTRACT

An aircraft having a fuselage provided with wing panels in staggered positions along the fuselage such that control surfaces of the forward wing panel are substantially closer to the center of gravity than are the control surfaces of the rearward wing panel. This arrangement results in reduced drag effects at transonic speeds, and provides a novel way of obtaining precise control of the aircraft position by using the control surfaces for vertical translation with minimum pitching moments.

12 Claims, 4 Drawing Figures

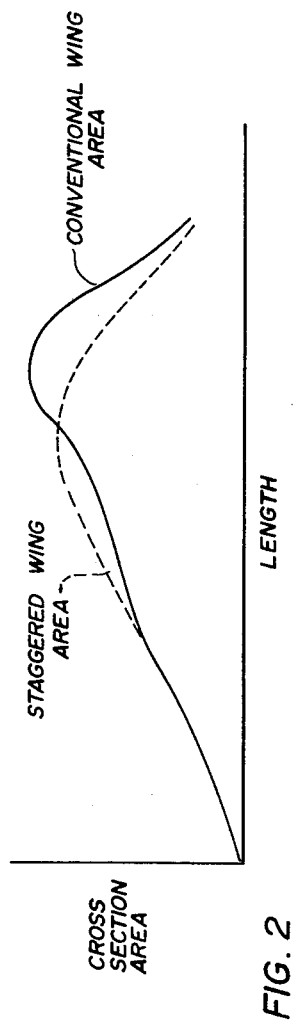
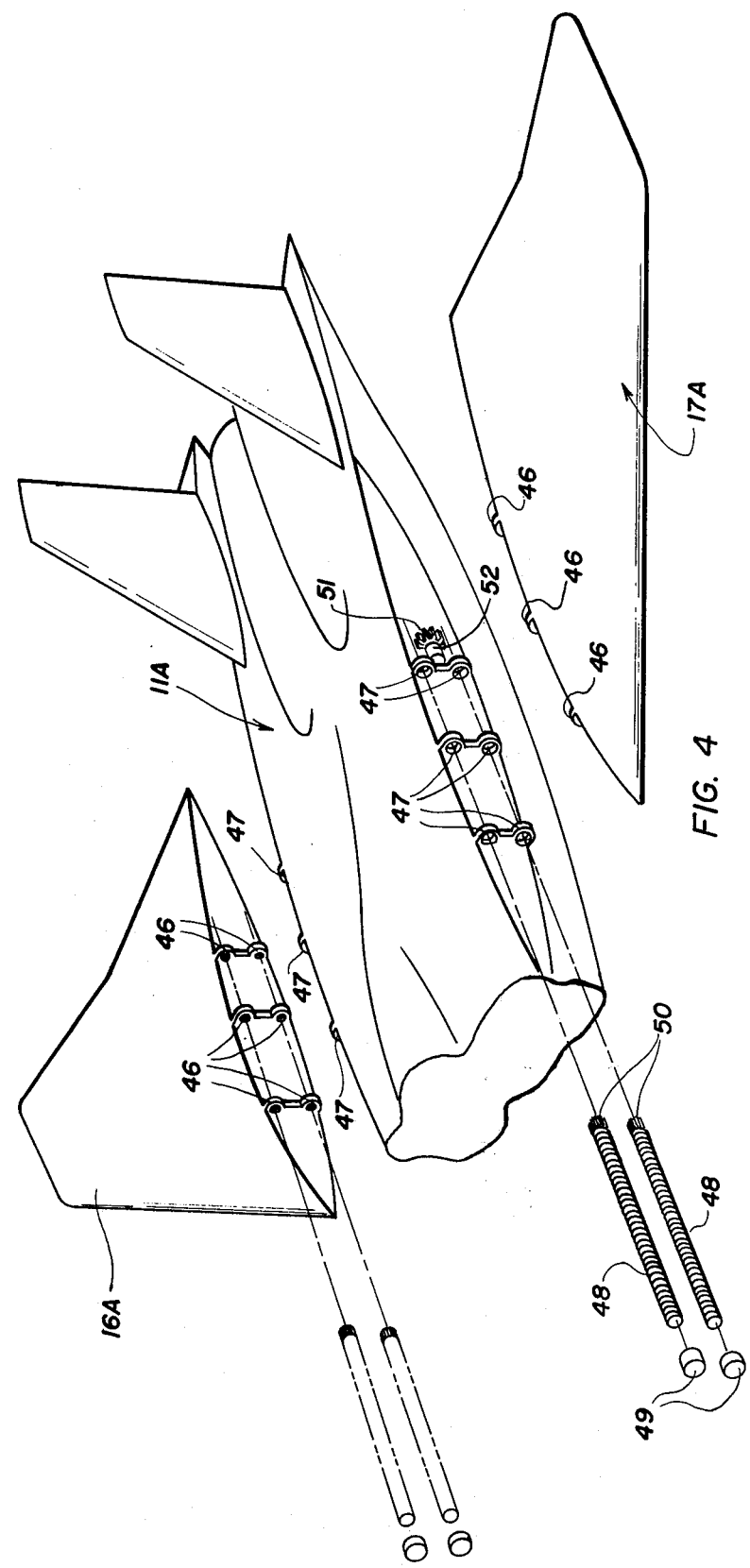
FIG. 2
FIG. 4

STAGGERWING AIRCRAFT

BACKGROUND OF THE INVENTION

The prior art contains a number of examples of aircraft having wing to fuselage configurations in which the wing may be yawed or skewed so as to be at oblique angles to the longitudinal axis of the fuselage. An early example is Wallis U.S. Pat. No. 2,504,767 granted Apr. 18, 1950 wherein the aeroplane and wing are arranged in such manner that the relative position of the wing and fuselage may be adjusted during flight about the spanwise axis of the wing, whether both left and right wing panels move in unison or differentially, or in a fore and aft direction, so that the center of pressure of the wing shifts in relation to the center of gravity of the aircraft. Another example is found in Jones, U.S. Pat. No. 3,737,121 granted June 5, 1973 and in which the aircraft included a pair of fuselages in parallel relation and coupled together by a main wing and the horizontal stabilizer through suitable pivot mechanism. In this configuration the airfoils are permitted to yaw relative to the fuselage for high speed flight while at the same time spreading the weight and volume distribution of the aircraft along the direction of flight. The disclosure in the foregoing patent was continued in a Continuation-in-Part U.S. Pat. No. 3,971,535 granted July 27, 1976 in which an aircraft with a single fuselage had a main wing and a horizontal stabilizer airfoil pivotally coupled to the fuselage at the centers of the airfoils. Again, this configuration was to allow for yawed relationship of the airfoils at high speed flight and normal right angled relationship for take-off, landing and low speed flight. Other configurations in the category of yawed airfoils are disclosed in Vickers-Armstrongs Limited Australian patent specification No. 150,962, granted Apr. 20, 1953.

Skewed or oblique wing configurations have been proposed and studied by others for the general purpose of reducing drag at high speed in the transonic region. However, none of these configurations avoids the difficulties of swept-forward wings which include structural instability, poor crew visibility, wing root to fuselage interference, and poor stall characteristics.

BRIEF DESCRIPTION OF THE INVENTION

This invention relates to staggerwing aircraft and especially to the positioning of the right and left wing panels on the fuselage in fore to aft offset relation compared to the more conventional configuration of symmetrical positioning.

One embodiment of the invention is found in the unsymmetrical configuration, in plan form, of having the right side wing panel placed in a position forward of its conventional position and having the left side wing panel placed in a position aft of its conventional position. In a configuration of this character there would not be any substantial change in most aerodynamic parameters affecting stability and control, but there would be a significant reduction in wave drag at or in the region of Mach 1.2. This significant reduction in wave drag is the result of distributing the cross sectional area of the wing panels along the length of the fuselage, as compared to the conventional symmetrical wing panel configuration.

In view of the foregoing, the invention resides in an aircraft having an asymmetrical airframe geometry for reducing drag at transonic speeds and for precise control comprising a fuselage elongated in the direction of the flight path, a pair of wing panels either fixedly connected into or movably mounted at the opposite sides of the fuselage, with one panel being more forward on the fuselage than the other panel in the asymmetrical configuration, and control surfaces hingedly mounted on the respective asymmetrically arranged panels in which the control surfaces on one wing panel predominately provide a lift component and the control surfaces on the other wing panel predominately provide pitch control.

BRIEF DESCRIPTION OF THE DRAWINGS

The invention in one embodiment is seen in the accompanying drawings, wherein:

FIG. 2 is a diagram comparing cross sectional area along the fuselage length of a conventional symmetrical swept wing aircraft and an asymmetrical swept wing aircraft of this invention;

FIG. 4 is a schematic exploded view of portions of the aircraft of FIG. 3 showing the mechanism by which wing panel translation may be accomplished.

DETAILED DESCRIPTION OF THE INVENTION

Figure 1:
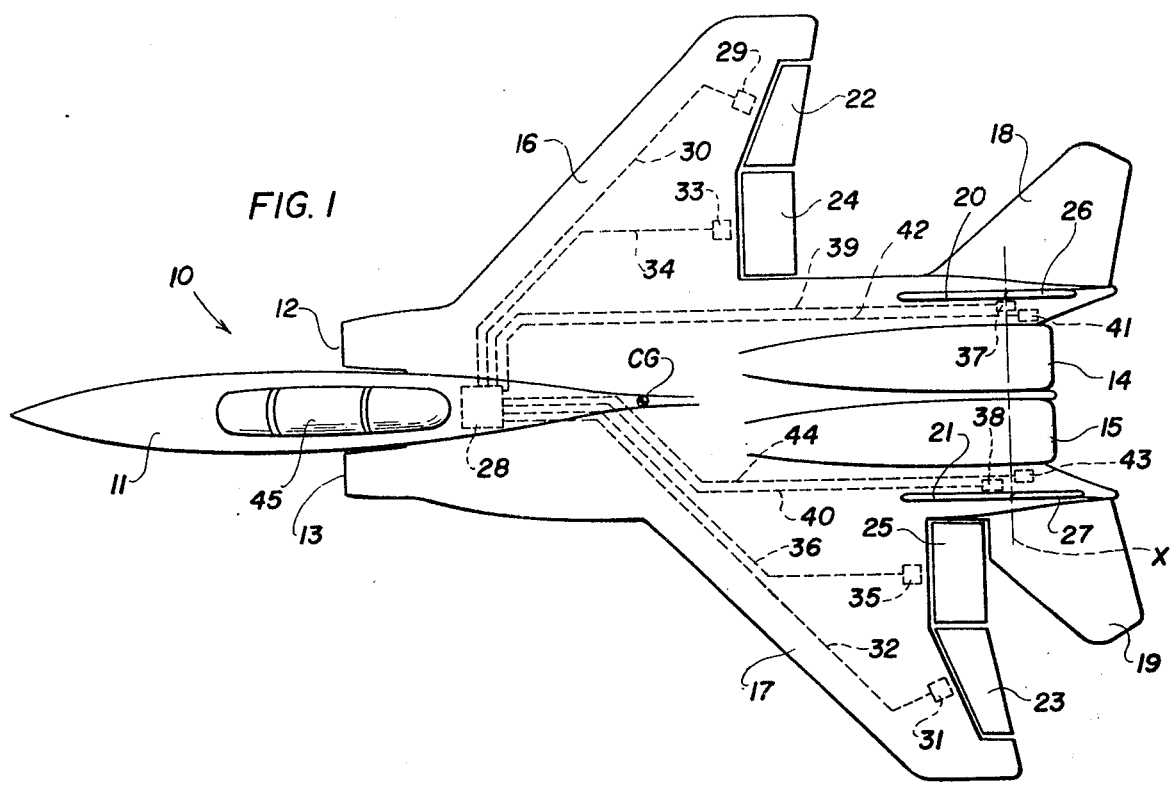
FIG. 1 is a schematic plan view of an aircraft having an asymmetrical configuration of wing panels, and in which control surfaces are hingedly connected to the trailing edges of the wing panels.

An embodiment of the present invention is seen in FIG. 1 in which the aircraft 10 has a longitudinally extending fuselage 11 carrying air intake scoops 12 and 13 on opposite sides of the fuselage which extend aftwardly into the engines. The engines are submerged in the fuselage and are provided with suitable exhaust nozzles 14 and 15. A right side wing panel 16 is connected to the side of the fuselage 11 and blended into the air intake scoop 12, and a left side wing panel 17 is connected to the opposite side of the fuselage 11 and blended into the air intake scoop 13. The fuselage 11 in the vicinity of the exhaust nozzles is provided with all movable horizontal stabilators 18 and 19, and also with vertical stabilators 20 and 21 respectively. The wing panels are provided with trailing edge outboard ailerons 22 and 23, and inboard flaps 24 and 25. The stabilators 20 and 21 carry the rudder surfaces 26 and 27 respectively.

The control system for the several flight surfaces includes conventional motor means connected into a central control center at 28. For example, right aileron 22 is moved by motor means 29 having its control lead 30 extended to control center 28, and the left aileron 23 has motor means 31 connected by lead 32 to the center 28. Right flap 24 is moved by motor means 33 connected by lead 34 to the center 28, and left flap 25 is moved by motor means 35 connected by lead 36 to the center 28. The vertical rudder 26 and 27 are controlled by motor means 37 and 38, and these motor means are connected by respective leads 39 and 40 to the control center 28. In like manner, the all movable horizontal stabilators 18 and 19 are mounted to pivot about the pivot axis X. The stabilator 18 is actuated by motor means 41 under control from lead 42, and stabilator 19 is actuated by motor means 43 under control from lead 44. Lead 42 and 44 are connected into the control center 28. The control center is under the command by the pilot located under the canopy 45, and the command signals may come either from autopilot means or manual means (not necessary to show).

The aircraft is responsive in roll by the use of the ailerons 22 and 23 and the horizontal stabilators 18 and 19 in a conventional manner as these control surfaces can be moved differentially. The rudders 26 and 27 also are moved conventionally for directional control of the flight path. The flaps 24 and 25, however, are used in a different mode resulting from the wing panel position longitudinally on the fuselage. In the embodiment shown in FIG. 1, as only one example, the right wing panel 16 is moved forward relative to the center of gravity (CG) and the left wing panel 17 is moved aft relative to the center of gravity. This asymmetrical configuration places the center of pressure for the right wing panel at a position that is forward relative to the CG, and the left wing panel center of pressure at a position that is aft relative to the CG. In this arrangement of a trailing edge down deflection of the right flap 24 on the wing panel trailing edge provides a positive lift increment which results in a vertical translation of the aircraft 10. This flap 24 being close to the CG of the aircraft does not develop significant pitching moment and rolling motion, and any such effect is easily counteracted by any of various combinations of trailing edge up deflections of the left side aileron 23 and flap 25. The combination of control surface motions needed to effect vertical movement of the aircraft is obtained by information fed into the control center 28.

It is appreciated that trailing edge displacement of the left flap 25 on the left wing panel 17, because of its greater displacement from the CG, will impose greater pitching moments than result from the displacement of the right flap 24. Thus, the primary intent in deflecting flap 25 is to effect a pitching rotation of the aircraft 10.

The effect of the asymmetrical configuration of the wing panels is illustrated in the diagram of FIG. 2 where the cross sectional area of the aircraft of FIG. 1 is plotted along its length and compared with the same area for an aircraft having a symmetrical wing configuration. The curve in full line represents a conventional aircraft having swept wing configuration. The broken line curve represents the staggered or asymmetrical swept wing aircraft configuration seen in FIG. 1. The broken line curve illustrates the smooth cross sectional area distribution, and shows up the marked cross sectional area increase of the symmetrical wing aircraft. The result is a reduction in wave drag because of the reduced maximum area and improved area distribution shape of the asymmetrical wing aircraft.

There are unique advantages to be derived from the asymmetric wing configuration for aircraft. For example, the trailing edge flap 24 on the more forward wing panel 16 can be used for direct vertical translation of the aircraft 10 due to its being close to the CG which minimizes pitching moments. Conversely, deflection of the trailing edge flap 25 on the more aft wing panel 17 produces large pitching moments for small changes in deflection, thereby being an effective control for pitch attitude. This configuration of wings for aircraft can be applied to most aircraft. For example, transport aircraft capable of Mach 1 to 1.4 cruise speeds can benefit from reduced drag which then permits use of smaller engines and that calls for less fuel required. Military aircraft can benefit by improved acceleration and maneuverability, as well as improved weapons integration.

Figure 3:
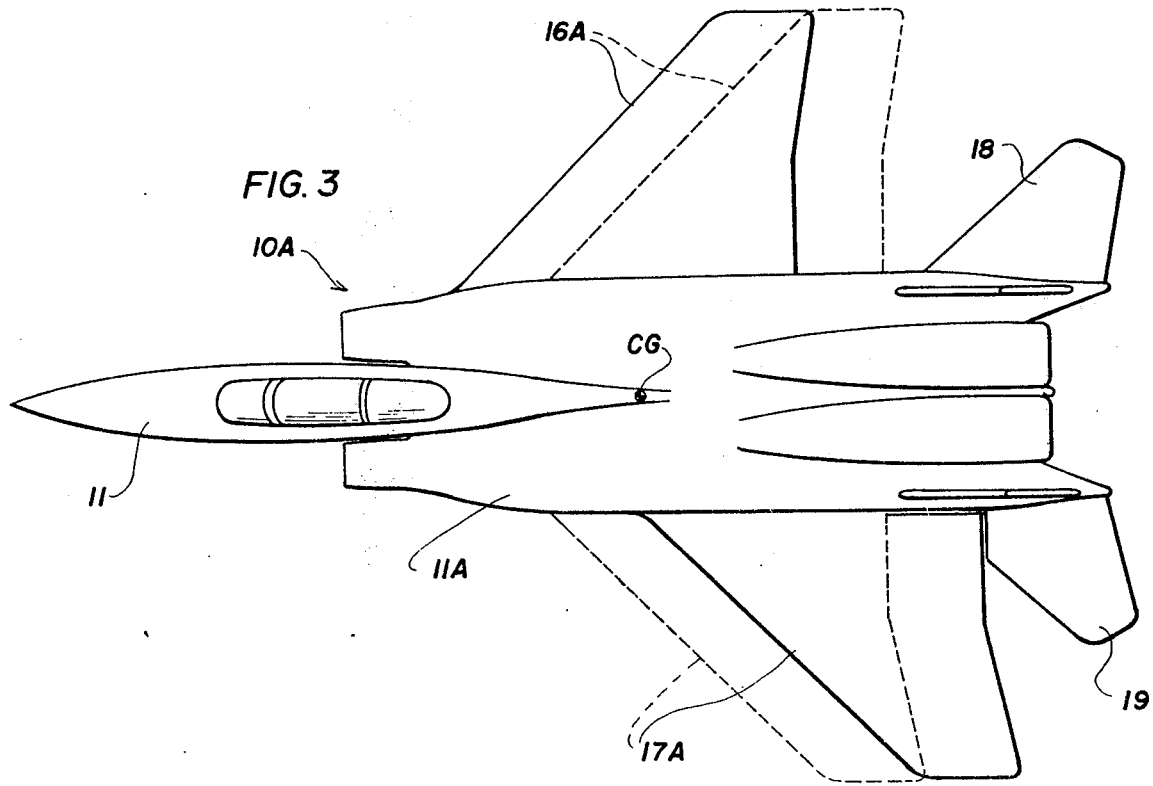
FIG. 3 is a schematic plan view of a modification of the aircraft seen in FIG. 1 wherein the wing panels are selectively longitudinally movable to accommodate certain flight conditions.

The modification illustrated in FIG. 3 depicts an aircraft 10A with wing panels 16A and 17A arranged to be supported from the fuselage 11 for translation fore and aft between a position in which the panels are symmetrically related (broken line) and a position in which the panels are staggered (full line) to conform substantially to the flight configuration seen in FIG. 1 without change of the same angle of sweep, as shown in FIG. 3, as this sweep angle is important. Heretofore, certain aircraft configurations have evolved in which the entire wing has been mounted to pivot relative to the fuselage so one portion swings forwardly while the opposite portion swings rearwardly. It is recognized that a configuration like that introduces flight instability responses. The present modification overcomes the problems of stability, and accomplishes the improvement of allowing the pilot to place the wing panels in symmetrical positions for take-off and landing, and to obtain the high speed flight advantages with the staggerwing configuration, all without changing the sweep of the wing panels as shown in FIG. 3.

There is shown in FIG. 4 a structural mounting for the respective wing panels 16A and 17A of the aircraft 10A. The panel 16A has its structural members brought out to a plurality of pairs of attachment lugs 46. Each lug is provided with an internal screw thread. The fuselage 11A is provided with matching lugs 47 which are best seen on the side of the fuselage adjacent the wing panel 17A. The lugs 47 are arranged in pairs and the apertures in the lugs are free of any screw thread. The lugs 47 on the fuselage and the lugs 46 on the respective wing panels are placed in conjunction so that the apertures align for the purpose of receiving screw shafts 48 which slide through the lugs 47 and thread through the lugs 46 into the desired initial position. After the screw shafts 48 are in the initial desired position caps 49 are fixed on the forward fuselage lugs 47 to prevent the screw shafts 48 from moving longitudinally or in forward or aft directions. However, the shafts 48 are permitted free rotation and are provided at the rearward ends with suitable gears 50 which are adapted to mesh with a drive gear 51 driven by a reversible motor 52. While not shown, it is understood that the arrangement for moving the wing panel 16A will be identical with that described for the wing panel 17A, and a separate motor drive will be provided. The drive motors for translating the wing panels 16A and 17A will receive command signals from the center 28 for the purpose of moving the respective wing panels into the symmetrical positions shown in broken line in FIG. 3 or into the staggered positions shown in full line in FIG. 3. It is understood that the drive motors must be independently controlable in order to be able to displace the entire wing panels differentially. The views of FIGS. 3 and 4 have been greatly simplified by omitting the control systems provided for the movable ailerons, flaps, and horizontal and vertical stabilators.

It is recognized that the effectiveness of the trailing edge flaps as take-off and landing aids will be degraded with the wings located unsymmetrically. In such instances where takeoff and landing performance is of critical importance, the wings will be mounted to the fuselage by means of a mechanism that will translate the wings in opposite directions without changing the sweep. Thus, the wings will be placed in a conventional, symmetrical, location for takeoff and landing then, once airborne, the pilot will position the wings in the unsymmetric location to obtain the advantages for high speed flight previously noted.

The present arrangement provides advantages for adapting the aircraft to different flight regimes, and allows the trailing edge flaps to be used in new ways. For example, the flap 24, being close to the CG is able to generate vertical forces with very little pitching moments. Conversely, deflection of the flap 25, being spaced from the CG is able to produce large moments for small changes in the lift, thereby rendering such surface effective to control pitch.

What is claimed is:

1. In aircraft, the combination of an elongated fuselage and a single wing providing substantially all the lift of said aircraft, said wing consisting of a first single wing panel connected at one side of said fuselage, a second single wing panel connected at the opposite side of said fuselage, said first and second single wing panels being similar and in substantial coplanar alignment from side-to-side, having the same angle of sweep and being staggered, with said first single wing panel offset from said second single wing panel so as to have an asymetrical relationship relative to the longitudinal axis of said fuselage.

2. The aircraft of claim 1 wherein said wing panels each have flight control surfaces hingedly connected in inboard and outboard relation along the trailing edge of said wing panels, said flight control surfaces on one wing panel being closer to the center of gravity of the aircraft than said flight control surfaces on the other wing panel.

3. The aircraft of claim 1 wherein said wing panels each have flight control surfaces hingedly connected along the trailing edge of said wing panels, certain of said flight control surfaces being ailerons and others thereof being flaps.

4. The aircraft of claim 1 wherein the aerodynamic center of one of said first and second wing panels is closer to the center of gravity of the aircraft than the aerodynamic center of the other one of said first and second wing panels.

5. The aircraft of claim 1 wherein control surfaces are hingedly mounted on said wing panels with the control surface on said first wing panel being movable to predominately provide a vertically directed flight control component and with the control surface on said second wing panel being movable to predominately provide a pitching component on the aircraft.

6. The aircraft of claim 1 wherein said fuselage and staggered wing panels form an airframe geometry having reduced drag at transonic speeds relative to an equivalent aircraft with symmetrical wing panels, each of said first and second wing panels have flight control surfaces hingedly mounted thereon, and means is operatively connected to said flight control surfaces to operate certain thereof for imposing predominately vertical components of control and others thereof for imposing predominately pitching components of control.

7. The aircraft of claim 1 wherein said elongated fuselage and asymmetrically related first and second wing panels are arranged to develop a cross section of substantially uniform increasing area along the length of the fuselage as measured from the fuselage nose to a lesser maximum cross sectional area aft of the center of gravity area of an equivalent aircraft with symmetrical wing panels.

8. In aircraft having an asymmetrical wing to airframe geometry for reduced drag at transonic speeds and for precise control comprising, the improvement of: a fuselage elongated in the direction of the flight path a single wing providing substantially all the lift of said aircraft, said wing consisting of; a single pair of wing panels connected into said fuselage at opposite sides thereof and in substantially the same side-to-side plane, with one of said wing panels being disposed more forward on said fuselage than the other wing panel; and control surfaces hingedly mounted on each of said wing panels, said control surface on said one more forward wing panel predominately providing a lift component and said control surface on said other wing panel predominately providing a pitch component.

9. The improvement set forth in claim 8, wherein the center of pressure of one wing panel is closer to the center of gravity of the aircraft than the center of pressure of the other wing panel.

10. The improvement set forth in claim 8, wherein said control surfaces include outboard trailing edge ailerons and inboard trailing edge flaps on said wing panels.

11. In a single wing aircraft convertible from a symmetrical wing configuration to a staggered wing configuration having substantially unchanged aerodynamic parameters affecting stability and control, and achieving significant reduction in wave drag at or in the region of Mach 1.2 for the staggered wing configuration, the combination of an elongated fuselage in which the center of gravity of the aircraft is located on the longitudinal axis of the fuselage, a pair of wing panels operably connected to said fuselage with one panel on each side of said fuselage and said panels having leading and trailing edges with said leading edges having the same angle of sweep, and means operating said panels between positions in symmetrical side-to-side alignment and positions with said panels staggered with one panel leading edge offset from the other panel leading edge so as to have an asymmetrical relationship relative to the longitudinal axes of said fuselage and without change in the sweep angle of said wing panels, such that the center of pressure of said panels are relatively displaced with respect to each other and with said center of gravity, and in such staggered wing configuration the cross sectional area of said panels is distributed along said fuselage to produce the reduction in wave drag.

12. The aircraft of claim 11 wherein control surfaces are hingedly mounted on said trailing edges of said wing panels, said control surface on one of said panels with its leading edge more forward than the leading edge of the other panel predominately providing a lift component and said control surface on the other wing panel trailing edge predominately providing a pitch component.

* * * * *

UNITED STATES PATENT AND TRADEMARK OFFICE
CERTIFICATE OF CORRECTION

PATENT NO. : 4,139,172
DATED : February 13, 1979
INVENTOR(S) : Chester W. Miller and Ray N. Herring It is certified that error appears in the above-identified patent and that said Letters Patent are hereby corrected as shown below:

Column 6, claim 7, line 4, after "gravity" and before "area" insert the phrase "of the aircraft when compared with the maximum cross sectional"

Signed and Sealed this

Eighth Day of May 1979

[SEAL]

Attest:

RUTH C. MASON
Attesting Officer

DONALD W. BANNER
Commissioner of Patents and Trademarks